United States Patent
Shen

(10) Patent No.: US 9,925,957 B2
(45) Date of Patent: Mar. 27, 2018

(54) WINDSCREEN WIPER STRIP SUPPORT AND WINDSCREEN WIPER BLADE HAVING SAME

(71) Applicant: Qinghuai Shen, Xiamen (CN)

(72) Inventor: Qinghuai Shen, Xiamen (CN)

( * ) Notice: Subject to any disclaimer, the term of this patent is extended or adjusted under 35 U.S.C. 154(b) by 273 days.

(21) Appl. No.: 14/649,921

(22) PCT Filed: Dec. 11, 2012

(86) PCT No.: PCT/CN2012/086356
§ 371 (c)(1),
(2) Date: Jun. 5, 2015

(87) PCT Pub. No.: WO2014/089755
PCT Pub. Date: Jun. 19, 2014

(65) Prior Publication Data
US 2015/0329085 A1    Nov. 19, 2015

(51) Int. Cl.
*B60S 1/04* (2006.01)
*B60S 1/38* (2006.01)

(52) U.S. Cl.
CPC ........... *B60S 1/3858* (2013.01); *B60S 1/0447* (2013.01); *B60S 1/0452* (2013.01); *B60S 1/3874* (2013.01); *B60S 1/3882* (2013.01); *B60S 1/381* (2013.01); *B60S 1/3848* (2013.01); *B60S 1/3867* (2013.01); *B60S 1/3879* (2013.01); *Y10T 403/32819* (2015.01)

(58) Field of Classification Search
CPC .... B60S 1/0441; B60S 1/0447; B60S 1/0452; B60S 1/34; B60S 1/381; B60S 1/3849; B60S 1/3851; B60S 1/3858; B60S 1/386; B60S 1/3874; B60S 1/3882; B60S 1/40; B60S 1/3853; B60S 1/3879; B60S 1/3848; Y10T 403/32819
USPC .......... 15/250, 201, 250.43, 250.32, 250.361
See application file for complete search history.

(56) References Cited

U.S. PATENT DOCUMENTS 2,589,339 A * 3/1952 Carson ...................... B60S 1/38
15/250.4
3,056,991 A * 10/1962 Smithers ............... B60S 1/3806
15/250.41

(Continued)

FOREIGN PATENT DOCUMENTS

CN  101151180 A * 3/2008 ............ B60S 1/3867
CN  101500862 A    8/2009
(Continued)

*Primary Examiner* — Joseph J Hail
*Assistant Examiner* — Arman Milanian
(74) *Attorney, Agent, or Firm* — Wayne & King LLC

(57) ABSTRACT

The present invention relates to a windscreen wiper strip support and a windscreen wiper blade having the windscreen wiper strip support. The windscreen wiper strip support includes a longitudinal slot for housing a windscreen wiper strip. The windscreen wiper strip support has a back plate, a plurality of first lugs and a plurality of second lugs. The longitudinal slot is formed by the space encircled by the back plate, the plurality of first lugs and the plurality of second lugs. The back plate, the plurality of first lugs and the plurality of second lugs are all made of a metallic material to ensure that the entire windscreen wiper strip support has better strength and the production cost is reduced.

2 Claims, 8 Drawing Sheets

(56) References Cited

U.S. PATENT DOCUMENTS

| | | | | |
|---|---|---|---|---|
| 3,088,155 A * | 5/1963 | Smithers | B60S 1/3806 | 15/250.201 |
| 3,350,738 A * | 11/1967 | Anderson | B60S 1/3806 | 15/250.201 |
| 3,427,637 A * | 2/1969 | Quinlan | B60S 1/3801 | 15/250.451 |
| 4,309,790 A * | 1/1982 | Bauer | B60S 1/3806 | 15/250.201 |
| 4,976,001 A * | 12/1990 | Wright | B60S 1/3805 | 15/250.44 |
| 6,266,843 B1 * | 7/2001 | Doman | B60S 1/38 | 15/250.201 |
| 7,370,385 B2 * | 5/2008 | Chiang | B60S 1/38 | 15/250.201 |
| 7,503,095 B2 * | 3/2009 | Lin | B60S 1/381 | 15/250.201 |
| 7,540,061 B1 * | 6/2009 | Huang | B60S 1/3881 | 15/250.201 |
| 7,774,892 B2 * | 8/2010 | Coughlin | B60S 1/4038 | 15/250.32 |
| 7,827,652 B2 * | 11/2010 | Yang | B60S 1/381 | 15/250.201 |
| 8,266,759 B2 * | 9/2012 | Braun | B60S 1/381 | 15/250.201 |
| 2004/0250369 A1 * | 12/2004 | Matsumoto | B60S 1/3801 | 15/250.201 |
| 2005/0011033 A1 * | 1/2005 | Thomar | B60S 1/381 | 15/250.201 |
| 2006/0179597 A1 * | 8/2006 | Hoshino | B60S 1/38 | 15/250.43 |
| 2007/0186366 A1 * | 8/2007 | Alley | B60S 1/28 | 15/250.4 |
| 2008/0222829 A1 * | 9/2008 | Chiang | B60S 1/386 | 15/250.32 |
| 2009/0056049 A1 * | 3/2009 | Jarasson | B60S 1/381 | 15/250.32 |
| 2011/0041280 A1 * | 2/2011 | Choi | B60S 1/3858 | 15/250.361 |
| 2011/0113580 A1 * | 5/2011 | Caillot | B60S 1/3862 | 15/250.01 |
| 2011/0162161 A1 * | 7/2011 | Amado | B60S 1/3801 | 15/250.361 |
| 2013/0117957 A1 * | 5/2013 | Ku | B60S 1/4019 | 15/250.201 |
| 2014/0143970 A1 * | 5/2014 | Baumert | B60S 1/3853 | 15/250.32 |

FOREIGN PATENT DOCUMENTS

| | | | | |
|---|---|---|---|---|
| CN | 202038271 U | * | 11/2011 | B60S 1/3867 |
| CN | 202163400 U | * | 3/2012 | B60S 1/3867 |
| DE | 2332408 A1 | * | 1/1974 | B60S 1/38 |
| DE | 10253580 A1 | * | 5/2004 | B60S 1/38 |
| DE | 102008012466 | * | 9/2009 | B60S 1/381 |
| EP | 1147955 A2 | * | 10/2001 | B60S 1/38 |
| FR | 2890026 A1 | * | 3/2007 | B60S 1/3858 |
| GB | 678149 A | * | 8/1952 | B60S 1/3882 |
| JP | 2003054383 A | * | 2/2003 | B60S 1/3867 |
| JP | 2005319963 A | * | 11/2005 | B60S 1/3867 |
| JP | 2010163134 A | * | 7/2010 | B60S 1/3867 |
| KR | 20050116469 A | * | 12/2005 | B60S 1/3882 |
| WO | WO 2008043622 A1 | * | 4/2008 | B60S 1/381 |
| WO | WO 2010016000 A1 | * | 2/2010 | B60S 1/3858 |
| WO | WO 2011101028 A1 | * | 8/2011 | B60S 1/3881 |
| WO | WO 2013042997 A2 | * | 3/2013 | B60S 1/3858 |

* cited by examiner

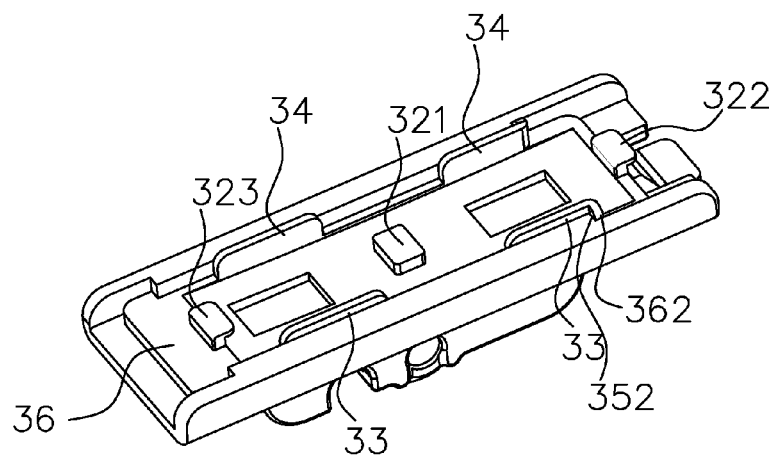
F I G. 10
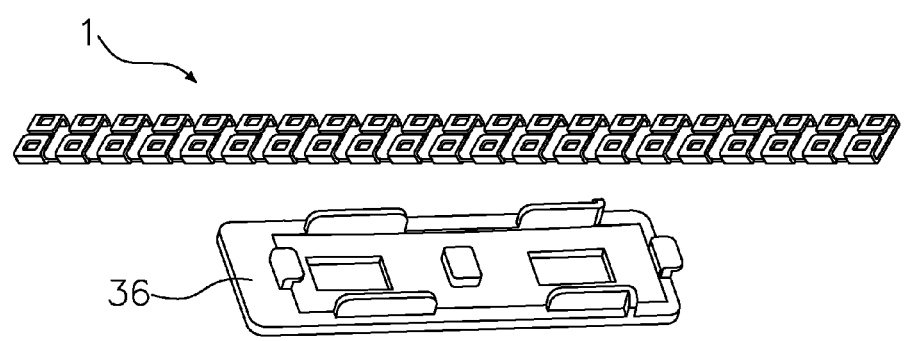
F I G. 11

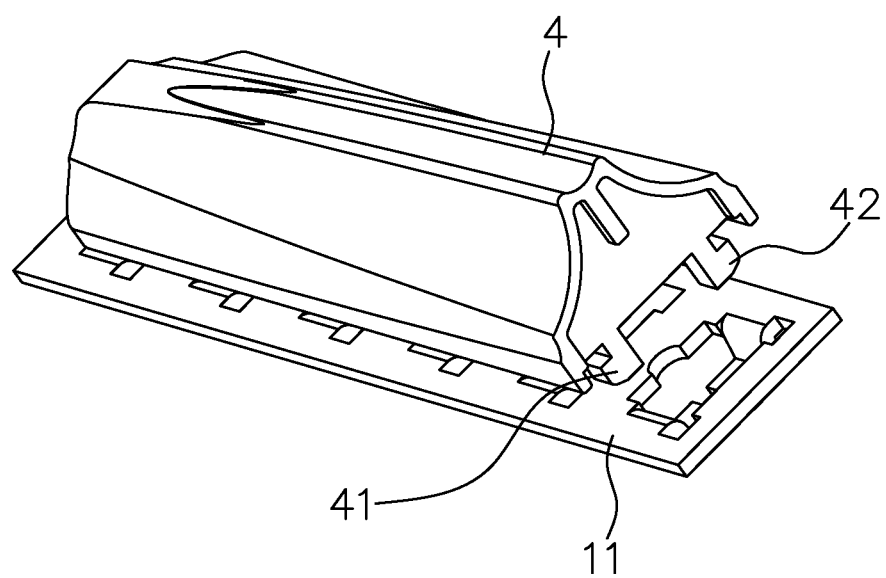
F I G. 16

WINDSCREEN WIPER STRIP SUPPORT AND WINDSCREEN WIPER BLADE HAVING SAME

BACKGROUND OF THE INVENTION (a) Technical Field of the Invention

The present invention relates to a windscreen wiper blade, and more particularly, to a windscreen wiper strip support, a forming method, and a windscreen wiper blade having the windscreen wiper strip support.

(b) Description of the Prior Art

Chinese Patent Publication No. CN101500862A discloses a windscreen wiper blade which is composed of a windscreen wiper strip support, a windscreen strip, and a coupling member. The cross-section of the windscreen wiper strip support has a substantial rectangular hollow material. The hollow material has a longitudinal slot facing the windscreen wiper strip for accommodating a dorsal strip of the windscreen wiper strip. The windscreen wiper strip support is disposed in the area of the coupling member, and has a groove at the side where the windscreen wiper strip support is located opposite the coupling member. The groove has a longitudinal side wall to mate with the longitudinal side wall of a longitudinal groove of the coupling member.

Thus, the longitudinal wall of the groove and the longitudinal side wall of the longitudinal groove form the connection of a dovetail groove. The coupling member can transversely intersect the longitudinal direction of the windscreen wiper strip support and be turned over the windscreen wiper strip support for installing the coupling member more easily.

The windscreen wiper strip support is made of a plastic material by one-step injection molding, which generally has a lower material strength, brittleness, poor resistance to fatigue. In order to ensure that the strength and service life of the windscreen wiper strip support, it is necessary to use more expensive plastic materials and a relatively complex structure. These will bring material costs, mold costs, processing problems, so it is difficult to implement and has a high cost.

Accordingly, the present invention intends to provide a dual faucet structure for improving the shortcomings mentioned above.

SUMMARY OF THE INVENTION

The primary object of the present invention is to provide a windscreen wiper strip support made of a metallic material to ensure a better structural stability when in use. The cost is controlled at a reasonable price, and the windscreen wiper strip support is practical.

According to one aspect of the present invention, a windscreen wiper strip support comprises a longitudinal slot facing a windscreen wiper strip for accommodating a dorsal strip of the windscreen wiper strip. The windscreen wiper strip support comprises a back plate extending longitudinally, a plurality of first lugs and a plurality of second lugs all connected to the back plate. The plurality of first lugs are spaced apart transversely on one side of the back plate. The plurality of second lugs are spaced apart transversely on another side of the back plate. The longitudinal slot is formed by a space encircled by the back plate, the plurality of first lugs and the plurality of second lugs. The back plate, the plurality of first lugs and the plurality of second lugs are all made of a metallic material; a middle portion of the back plate being pressed downward and bent to form the plurality of first lugs and the plurality of second lugs.

Preferably, the plurality of first lugs and the plurality of second lugs have an L shape, respectively.

Preferably, the back plate, the plurality of first lugs, and the plurality of second lugs are integrally formed.

Preferably, the back plate, the plurality of first lugs and the plurality of second lugs are provided with hollowed holes respectively for saving material and reducing weight.

Preferably, the plurality of first lugs and the plurality of second lugs are formed by bending the two sides of the back plate towards a middle portion of the back plate.

According to another aspect of the present invention, a windscreen wiper blade having a windscreen wiper strip support is provided. The windscreen wiper strip support comprises a back plate extending longitudinally, a plurality of first lugs and a plurality of second lugs all connected to the back plate. The plurality of first lugs are spaced apart transversely on one side of the back plate. The plurality of second lugs are spaced apart transversely on another side of the back plate. A longitudinal slot is formed by a space encircled by the back plate, the plurality of first lugs and the plurality of second lugs. The back plate, the plurality of first lugs and the plurality of second lugs are all made of a metallic material.

The windscreen wiper blade comprises a windscreen wiper strip and a coupling member. The windscreen wiper strip has a windscreen wiper lip and a dorsal strip inserted into the longitudinal slot.

The coupling member comprises a hinge member for pivotally connecting with a windscreen wiper power lever and a positioning assembly for connecting with the windscreen wiper strip support.

The back plate is further formed with at least three positioning grooves. The positioning assembly comprises a positioning protrusion, a first engaging claw, and a second engaging claw. The first engaging claw and the second engaging claw are disposed at two longitudinal ends of the positioning assembly. The positioning protrusion is located between the first engaging claw and the second engaging claw. The positioning protrusion, the first engaging claw and the second engaging claw correspond to the positioning grooves, respectively. The first engaging claw and the second engaging claw have hooks for engaging with the positioning grooves.

Preferably, the coupling assembly further comprises a first limit block and a second limit block at two lateral sides thereof. Inner sides of the first limit block and the second limit block lean against side walls of the windscreen wiper strip support.

Preferably, the coupling assembly has a connecting head and a base. The hinge member is disposed on the connecting head. The positioning assembly is disposed on the base. The base has guide blocks disposed at two lateral sides thereof and extending longitudinally. The connecting head is formed with a guide trough for insertion of the guide block. The base is further formed with a first limit piece. The connecting head is provided with a stop seat for the first limit piece to be positioned thereat so that the base is restrained from sliding on the connecting head. The connecting head is further provided with an elastic seat. The elastic seat is provided with a stop block for blocking the base from sliding out of the connecting head.

The present invention relates to a windscreen wiper strip support, a forming method, and a windscreen wiper blade having the windscreen wiper strip support. The back plate, the plurality of first lugs, and the plurality of second lugs are all made of a metallic material to ensure that the entire windscreen wiper strip support has a better structural stability and transverse rigidity when in use. Furthermore, through the first lugs and the second lugs, the entire windscreen wiper strip support has better elasticity and can be used smoothly.

BRIEF DESCRIPTION OF THE DRAWINGS

FIG. 10 is a perspective view of FIG. 8 seen from another angle;

FIG. 11 is a schematic view of the windscreen wiper strip support according to the first embodiment of the present invention in cooperation with a base;

FIG. 16 is an exploded view of FIG. 14 showing cooperation of the guide plate and the windscreen wiper strip.

DETAILED DESCRIPTION OF THE PREFERRED EMBODIMENTS

Figure 1:
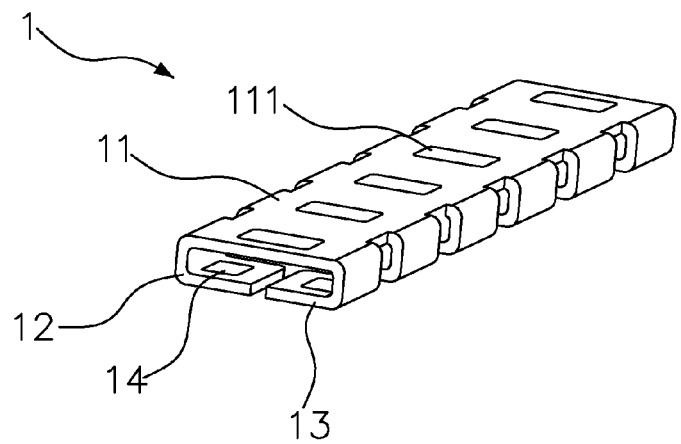
FIG. 1 is a perspective view of a windscreen wiper strip support according to a first embodiment of the present invention.

Embodiments of the present invention will now be described, by way of example only, with reference to the accompanying drawings.

As shown in FIG. 1 through FIG. 11, a windscreen wiper strip support 1 according to a first embodiment of the present invention comprises a back plate 11, a plurality of first lugs 12, and a plurality of second lugs 13. The back plate 11 extends longitudinally. The plurality of first lugs 12 and the plurality of second lugs 13 are all connected to the back plate 11. The plurality of first lugs 12 are spaced apart transversely on one side of the back plate 11, and the plurality of second lugs 13 are spaced apart transversely on another side of the back plate 11. A longitudinal slot is formed by the space encircled by the back plate, the plurality of first lugs, and the plurality of second lugs. The longitudinal slot faces a windscreen wiper strip 2 for accommodating a dorsal strip 22 of the windscreen wiper strip 2. The back plate 11, the plurality of first lugs 12, and the plurality of second lugs 13 are all made of a metallic material.

Specifically, in this embodiment, the plurality of first lugs 12 and the plurality of second lugs 13 are formed by bending the two sides of the back plate 11 towards a middle portion of the back plate 11. The plurality of first lugs 12 and the plurality of second lugs 13 have an L shape, respectively. The back plate 11, the plurality of first lugs 12, and the plurality of second lugs 13 are integrally formed. In order to save the material and reduce the weight, the back plate 11, the plurality of first lugs 12, and the plurality of second lugs 13 are provided with hollowed holes 14, respectively.

As shown in FIG. 2 to FIG. 7, a windscreen wiper blade 100 comprises a windscreen wiper strip 2 and a coupling member 3. The windscreen wiper strip 2 has a windscreen wiper lip 21 and a dorsal strip 22 which can be inserted into the longitudinal slot. The coupling member 3 comprises a hinge member 31 for pivotally connecting with a windscreen wiper power lever and a positioning assembly 32 for connecting with the windscreen wiper strip support 1.

Figure 2:
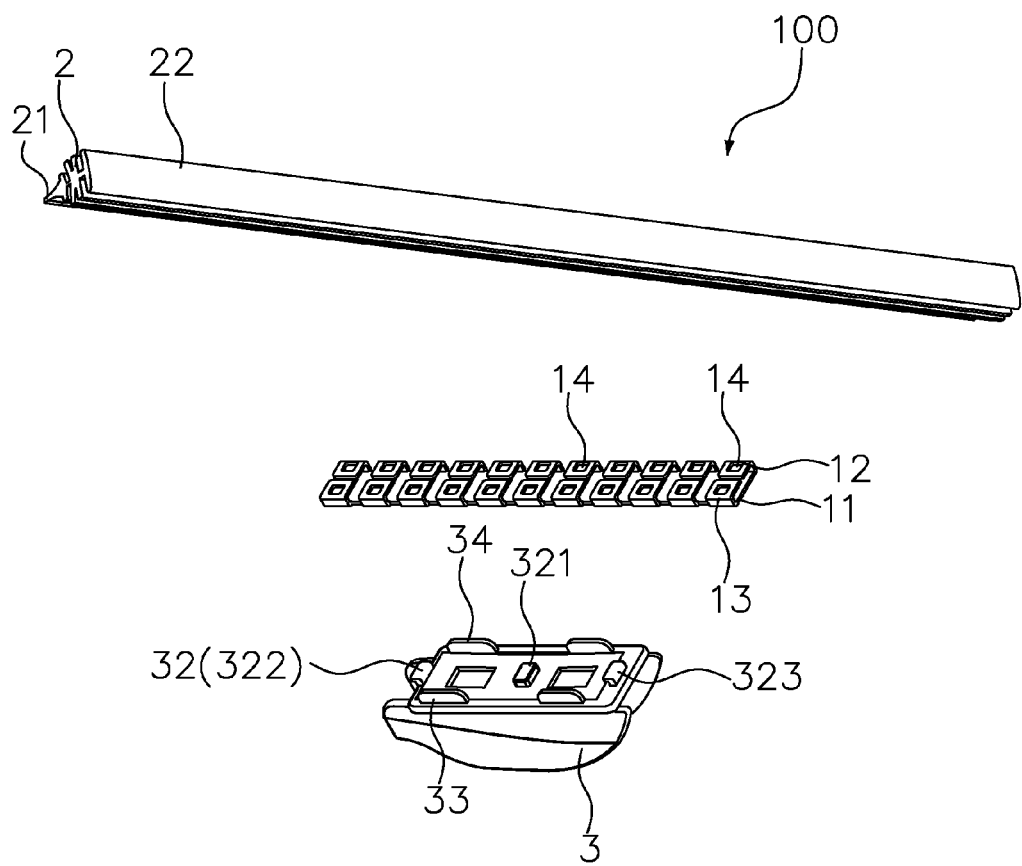
FIG. 2 is an exploded view of the windscreen wiper strip support according to the first embodiment of the present invention applied to a windscreen wiper blade.
Figure 3:
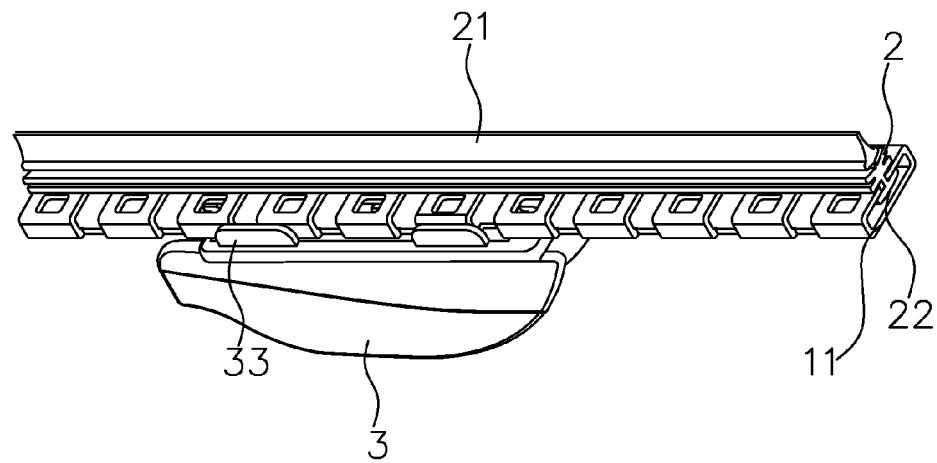
FIG. 3 is an assembled perspective view of the windscreen wiper strip support according to the first embodiment of the present invention applied to the windscreen wiper blade.
Figure 4:
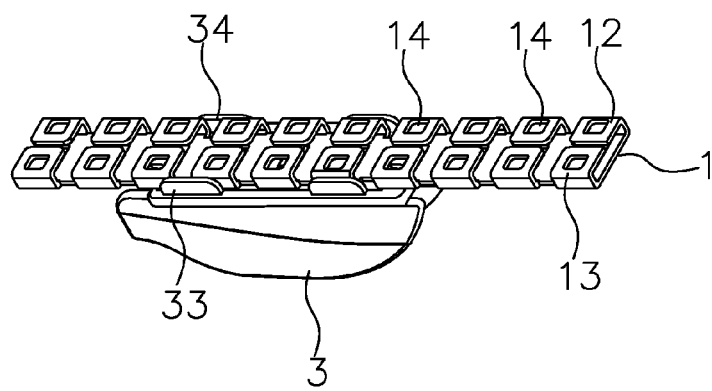
FIG. 4 is an assembled schematic view of the windscreen wiper strip support according to the first embodiment of the present invention in cooperation with a coupling assembly.
Figure 5:
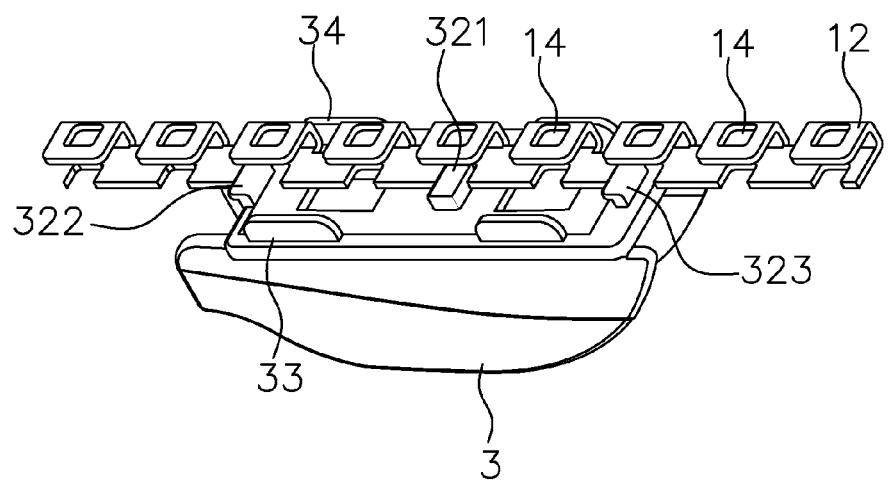
FIG. 5 is a semi-sectional schematic view of the windscreen wiper strip support according to the first embodiment of the present invention in cooperation with the coupling assembly.
Figure 6:
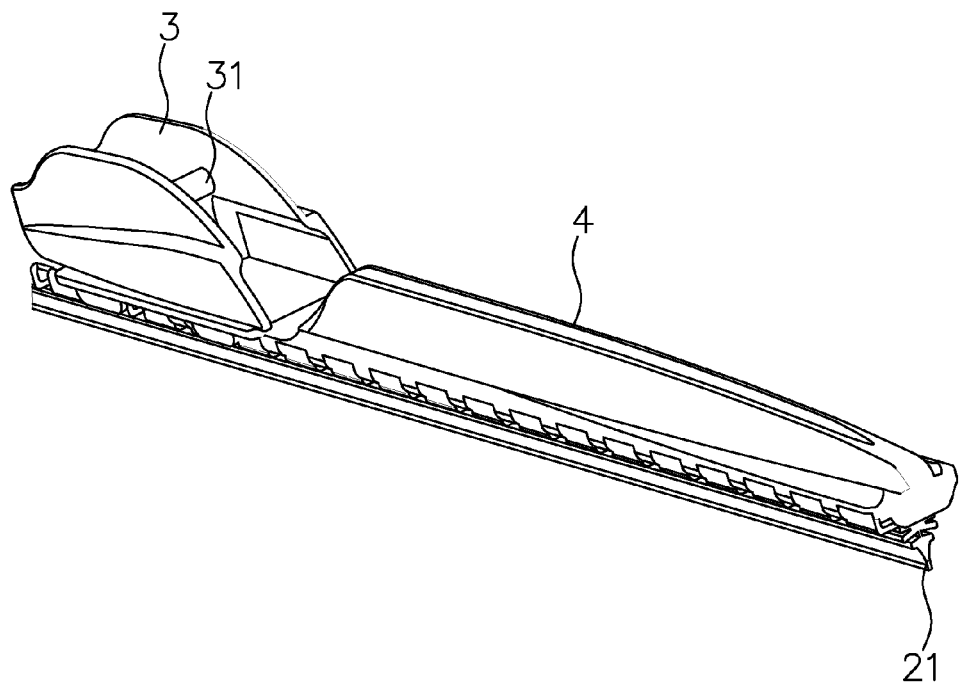
FIG. 6 is an assembled perspective view of the windscreen wiper strip support according to the first embodiment of the present invention applied to the windscreen wiper blade and coupled with a guide plate.

As shown in FIG. 1, the back plate 11 is further formed with at least three positioning grooves 111. In this embodiment, the hollowed holes 14 and the positioning grooves 111 of the back plate 11 have the same shape, namely, the positioning grooves 111 function as the hollowed holes 14. As shown in FIG. 2, the positioning assembly 32 comprises a positioning protrusion 321, a first engaging claw 322, and a second engaging claw 323. The first engaging claw 322 and the second engaging claw 323 are disposed at two longitudinal ends of the positioning assembly 32. The positioning protrusion 321 is located between the first engaging claw 322 and the second engaging claw 323. The positioning protrusion 321, the first engaging claw 322, and the second engaging claw 323 correspond to the positioning grooves 111, respectively. The first engaging claw 322 and the second engaging claw 323 have hooks for engaging with the positioning grooves 111.

In order to steady the windscreen wiper support 1, as shown in FIG. 2 through FIG. 5 as well as FIG. 2 through FIG. 11, the coupling assembly 3 further comprises a first limit block 33 and a second limit block 34 at two lateral sides thereof. Inner sides of the first limit block 33 and the second limit block 34 lean against side walls of the windscreen wiper strip support 1.

FIG. 8 through FIG. 11 shows another embodiment of the coupling assembly 3 which is in separate configuration. Specifically, the coupling assembly 3 has a connecting head 35 and a base 36. The hinge member 31 is disposed on the connecting head 35. The positioning assembly 32 is disposed on the base 36. The base 36 has guide blocks 361 disposed at two lateral sides thereof and extending longitudinally. In this embodiment, the guide blocks 361 are side edges of the base 36. The connecting head 35 is formed with a guide trough 351 for insertion of the guide block 361. The guide trough 351 is formed with a flange portion 355 for preventing the base 36 from disengagement. The base 36 is further formed with a first limit piece 362. The connecting head 35 is provided with a stop seat 352 for the first limit piece 362 to be positioned thereat so that the base 36 is restrained from sliding on the connecting head 35. The connecting head 35 is further provided with an elastic seat 353. The elastic seat 353 is provided with a stop block 354 for blocking the base 36 from sliding out of the connecting head 35. In this way, the stability of connection can be assured, and it is convenient for assembly and disassembly.

As shown in FIG. 12 through FIG. 16, a windscreen wiper strip support 1 according to a second embodiment of the present invention comprises a back plate 11, a plurality of first lugs 12, and a plurality of second lugs 13. The forming way of the second embodiment is different from that of the first embodiment. The plurality of first lugs 12 and the plurality of second lugs 13 are directly formed on the back plate 11 by pressing the back plate 11 downward, namely, a middle portion of the back plate 11 is pressed downward and bent to form the plurality of first lugs 12 and the plurality of second lugs 13. Therefore, the material can be saved and it is convenient for processing.

Figure 7:
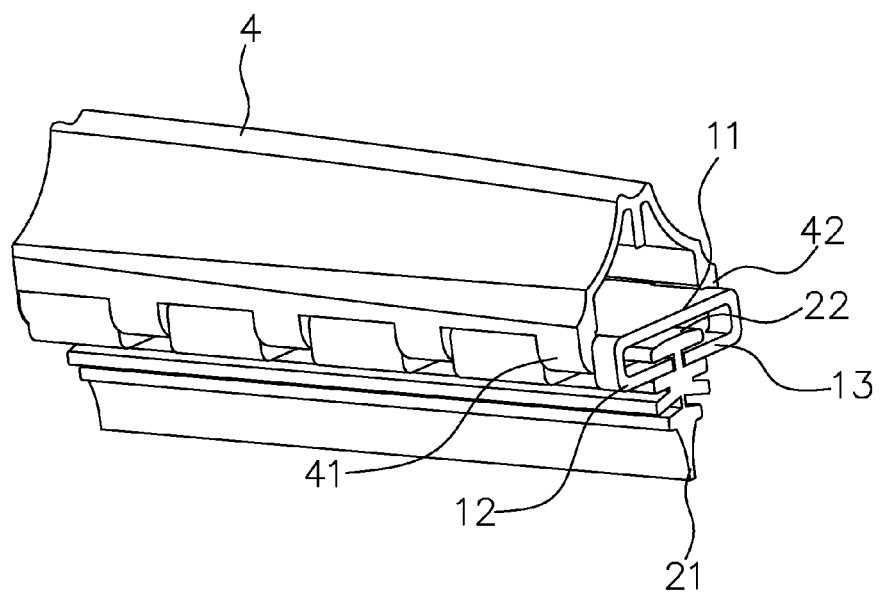
FIG. 7 is a partial view of FIG. 6.
Figure 8:
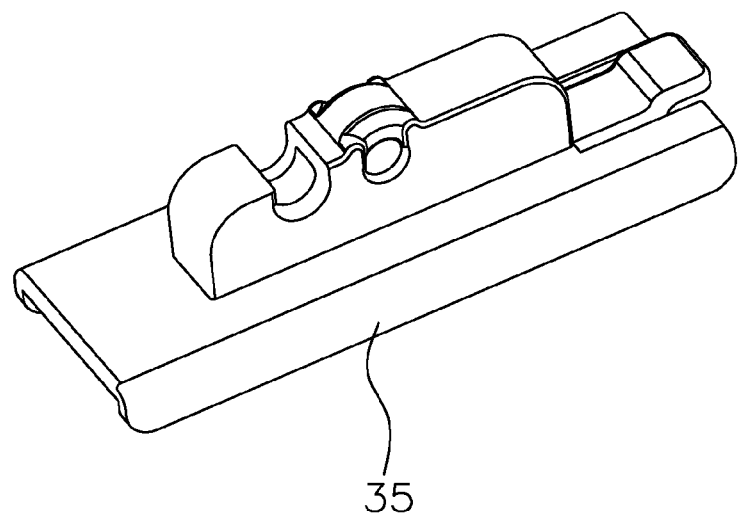
FIG. 8 is a schematic view of the windscreen wiper strip support according to the first embodiment of the present invention coupled with another embodiment of the coupling assembly.
Figure 9:
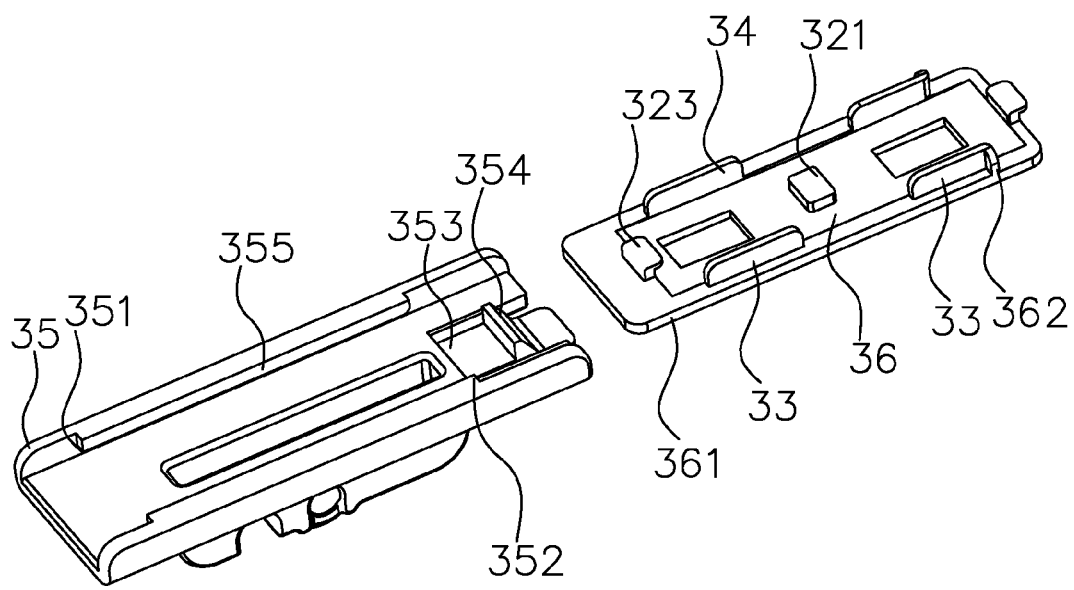
FIG. 9 is an exploded view of FIG. 8.
Figure 12:
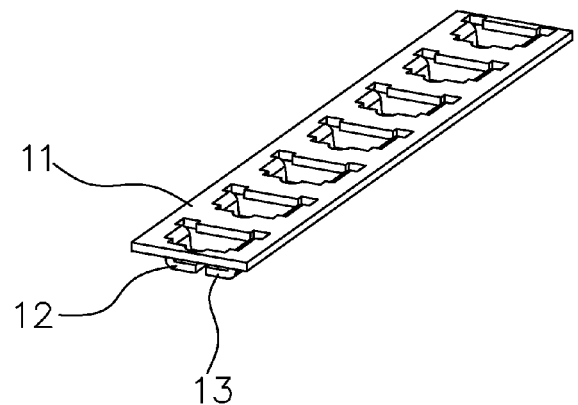
FIG. 12 is a perspective view of a windscreen wiper strip support according to a second embodiment of the present invention.
Figure 13:
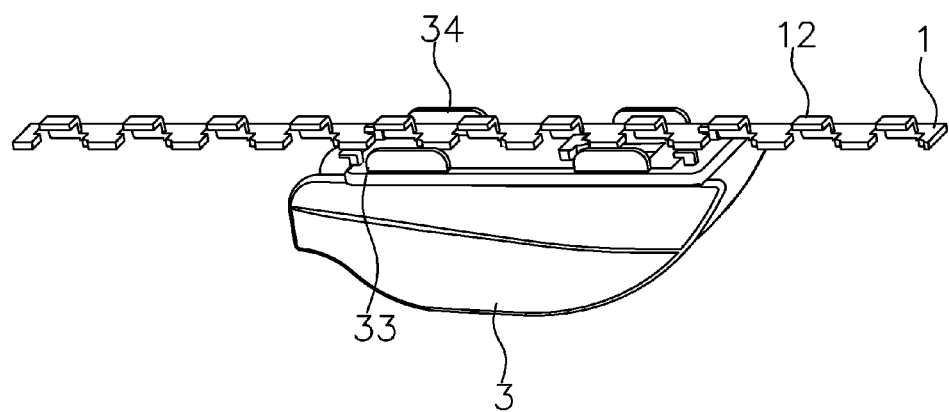
FIG. 13 is a perspective view of the windscreen wiper strip support according to the second embodiment of the present invention in cooperation with the coupling assembly.
Figure 14:
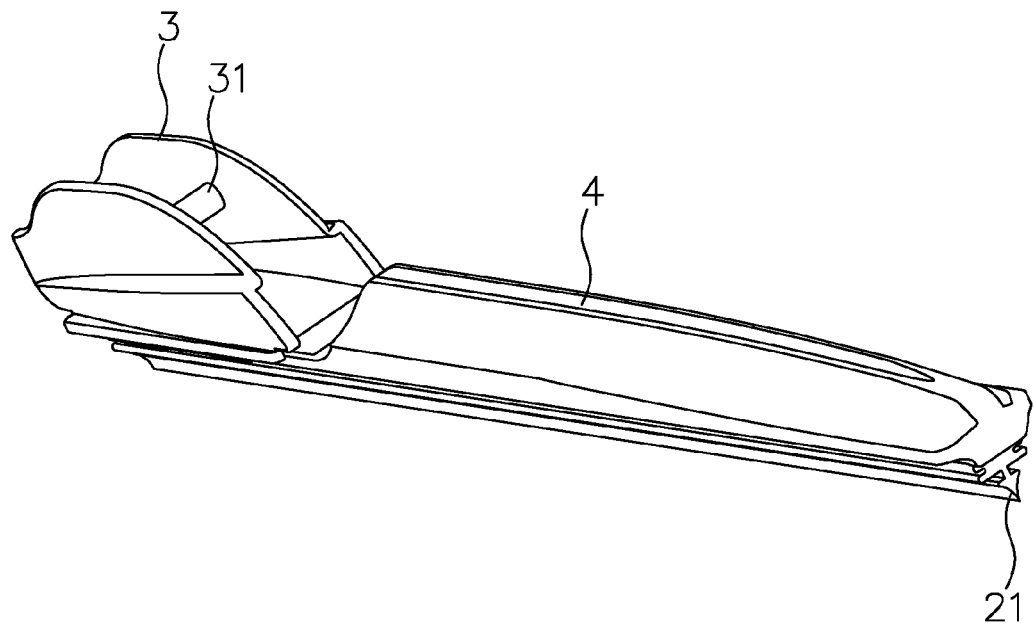
FIG. 14 is a perspective view of the windscreen wiper strip support according to the second embodiment of the present invention in cooperation with a guide plate, the coupling assembly, and a windscreen wiper strip.
Figure 15:
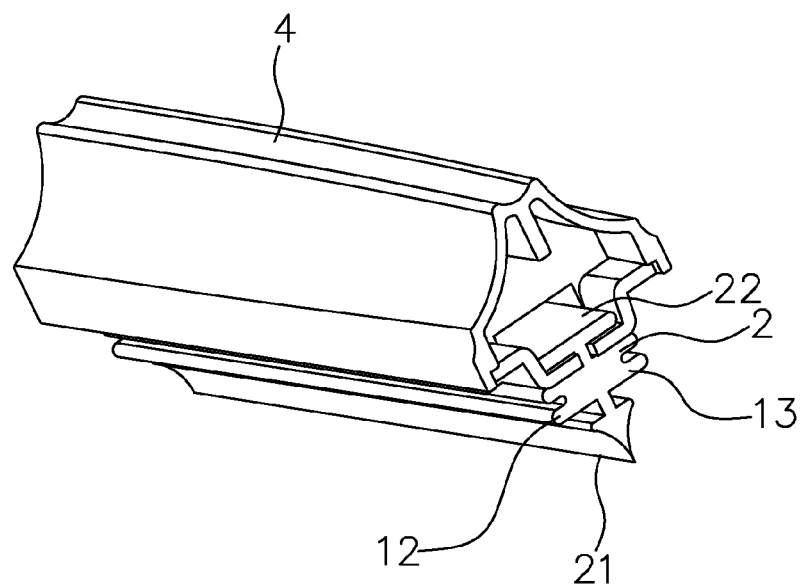
FIG. 15 is a partial view of FIG. 14.

It is noted that, referring to FIG. 6, FIG. 7, FIG. 14, FIG. 15 and FIG. 16, the windscreen wiper blade 100 is equipped with a guide plate 4 for guiding wind. Specifically, in the first embodiment, as shown in FIG. 7, the guide plate 4 is formed with a plurality of first buckle claws 41 and a plurality of second buckle claws 42. The plurality of first buckle claws 41 are spaced apart on one side of the guide plate 4, and the plurality of second buckle claws 42 are spaced apart on another side of the guide plate 4. Each first buckle claw 41 is buckled to an adjacent first lug 12, and each second buckle claw 42 is buckled to an adjacent second lug 13. The first buckle claws 41 and the second buckle claws 42 are curved inward in order to achieve connection of the guide plate 4 and the windscreen wiper strip support 1. In the second embodiment, as shown in FIG. 16, the first buckle claws 41 and the second buckle claws 42 are disposed at the middle portion of the guide plate 4 and curved outward.

To sum up the aforesaid, the present invention relates to a windscreen wiper strip support 1, a forming method, and a windscreen wiper blade 100 having the windscreen wiper strip support 1. The back plate 11, the plurality of first lugs 12, and the plurality of second lugs 13 are all made of a metallic material to ensure that the entire windscreen wiper strip support has relatively good strength. Furthermore, through the first lugs 12 and the second lugs 13, the entire windscreen wiper strip support 1 has better elasticity and can be used smoothly.

Although particular embodiments of the present invention have been described in detail for purposes of illustration, various modifications and enhancements may be made without departing from the spirit and scope of the present invention. Accordingly, the present invention is not to be limited except as by the appended claims.

I claim:

1. A windscreen wiper blade having a windscreen wiper strip support, characterized by: the windscreen wiper strip support comprising a back plate extending longitudinally, a plurality of first lugs and a plurality of second lugs all connected to the back plate, the plurality of first lugs being spaced apart transversely on one side of the back plate, the plurality of second lugs being spaced apart transversely on another side of the back plate, a longitudinal slot being formed by a space encircled by the back plate, the plurality of first lugs and the plurality of second lugs, the back plate, the plurality of first lugs and the plurality of second lugs being all made of a metallic material;

the windscreen wiper blade comprising a windscreen wiper strip and a coupling member, the windscreen wiper strip having a windscreen wiper lip and a dorsal strip inserted into the longitudinal slot;

the coupling member comprising a hinge member for pivotally connecting with a windscreen wiper power lever and a positioning assembly for connecting with the windscreen wiper strip support;

the back plate being further formed with at least three positioning grooves, the positioning assembly comprising a positioning protrusion, a first engaging claw, and a second engaging claw, the first engaging claw and the second engaging claw being disposed at two longitudinal ends of the positioning assembly, the positioning protrusion being located between the first engaging claw and the second engaging claw, the positioning protrusion, the first engaging claw and the second engaging claw corresponding to the positioning grooves respectively, the first engaging claw and the second engaging claw having hooks for engaging with the positioning grooves;

wherein the coupling member further comprises a first limit block and a second limit block at two lateral sides thereof, and inner sides of the first limit block and the second limit block lean against side walls of the windscreen wiper strip support.

2. A windscreen wiper blade having a windscreen wiper strip support, characterized by: the windscreen wiper strip support comprising a back plate extending longitudinally, a plurality of first lugs and a plurality of second lugs all connected to the back plate, the plurality of first lugs being spaced apart transversely on one side of the back plate, the plurality of second lugs being spaced apart transversely on another side of the back plate, a longitudinal slot being formed by a space encircled by the back plate, the plurality of first lugs and the plurality of second lugs, the back plate, the plurality of first lugs and the plurality of second lugs being all made of a metallic material;

the windscreen wiper blade comprising a windscreen wiper strip and a coupling member, the windscreen wiper strip having a windscreen wiper lip and a dorsal strip inserted into the longitudinal slot;

the coupling member comprising a hinge member for pivotally connecting with a windscreen wiper power lever and a positioning assembly for connecting with the windscreen wiper strip support;

the back plate being further formed with at least three positioning grooves, the positioning assembly comprising a positioning protrusion, a first engaging claw, and a second engaging claw, the first engaging claw and the second engaging claw being disposed at two longitudinal ends of the positioning assembly, the positioning protrusion being located between the first engaging claw and the second engaging claw, the positioning protrusion, the first engaging claw and the second engaging claw corresponding to the positioning grooves respectively, the first engaging claw and the second engaging claw having hooks for engaging with the positioning grooves;

wherein the coupling member has a connecting head and a base, the hinge member being disposed on the connecting head, the positioning assembly being disposed on the base, the base having guide blocks disposed at two lateral sides thereof and extending longitudinally, the connecting head being formed with a guide trough for insertion of the guide block; the base being further formed with a first limit piece, the connecting head being provided with a stop seat for the first limit piece to be positioned thereat so that the base is restrained from sliding on the connecting head, the connecting head being further provided with an elastic seat, the elastic seat being provided with a stop block for blocking the base from sliding out of the connecting head.

* * * * *